March 9, 1965 G. T. RANDOL 3,172,337
COMPRESSED-AIR OPERATED BRAKE BOOSTER MECHANISM
Filed July 17, 1962 5 Sheets-Sheet 4
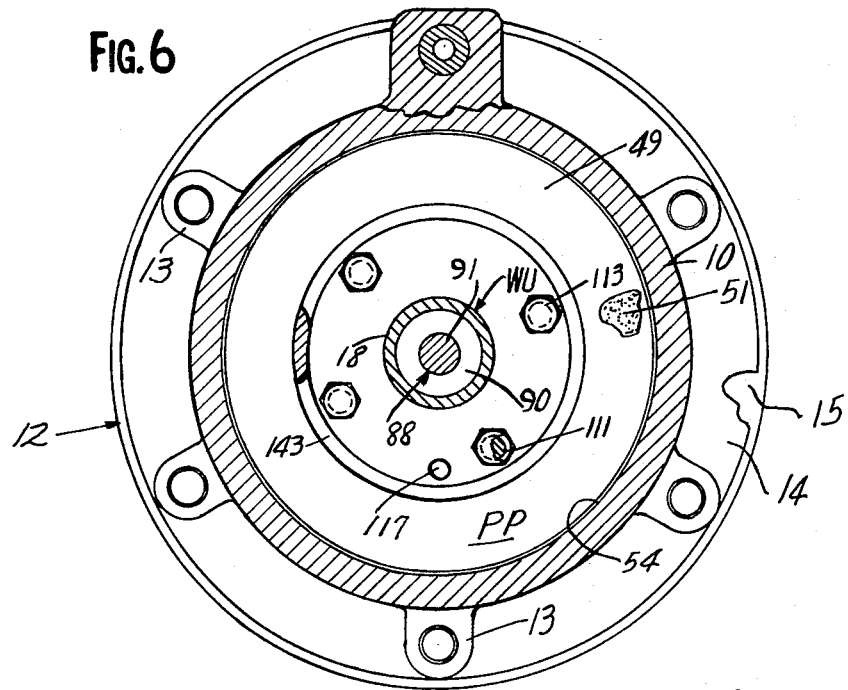
FIG. 6
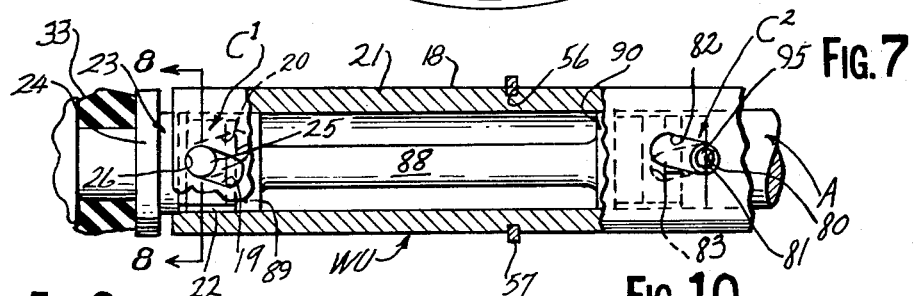
FIG. 7
FIG. 8 FIG. 10
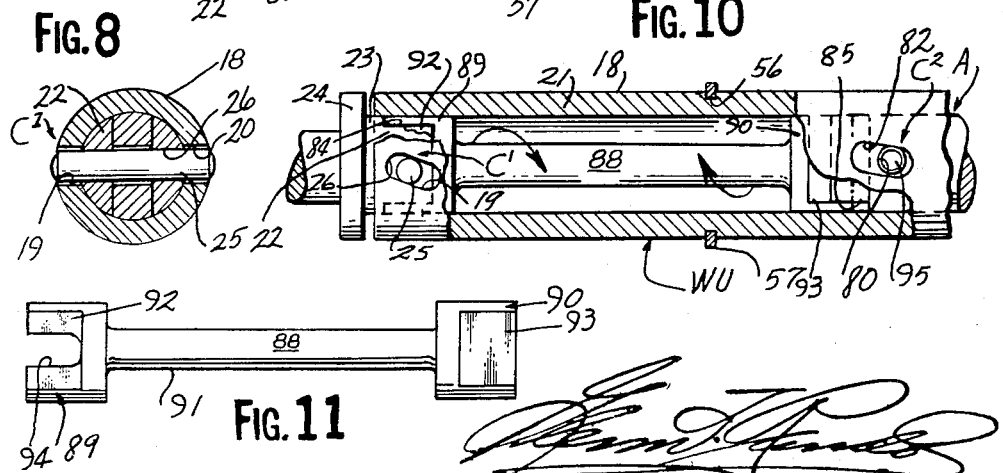
FIG. 11
Inventor March 9, 1965
G. T. RANDOL
3,172,337
COMPRESSED-AIR OPERATED BRAKE BOOSTER MECHANISM
Filed July 17, 1962
5 Sheets-Sheet 5
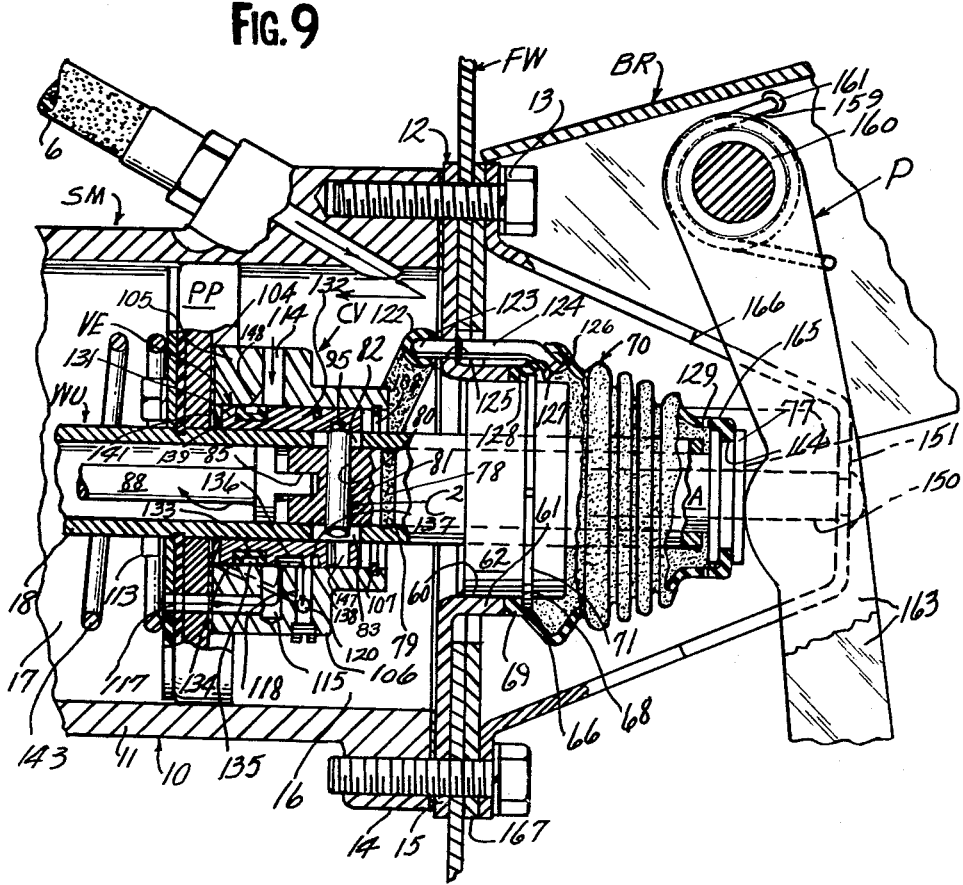
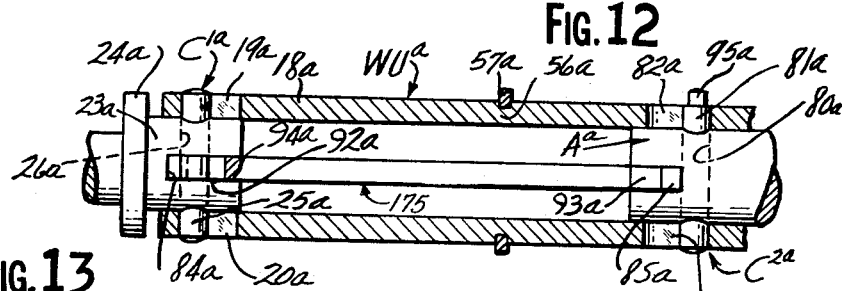
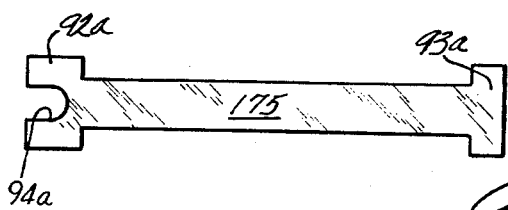
Inventor United States Patent Office 3,172,337
Patented Mar. 9, 1965

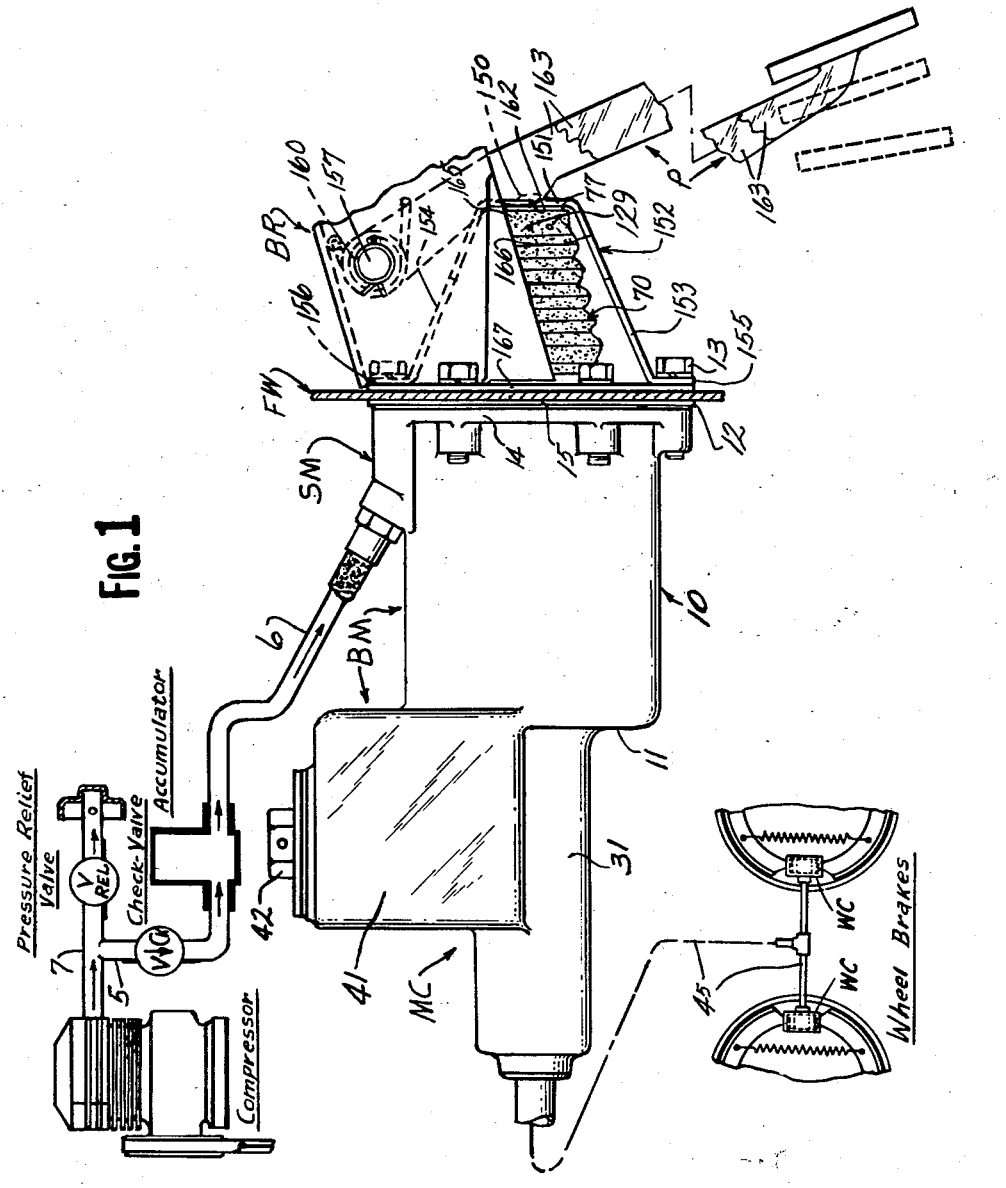

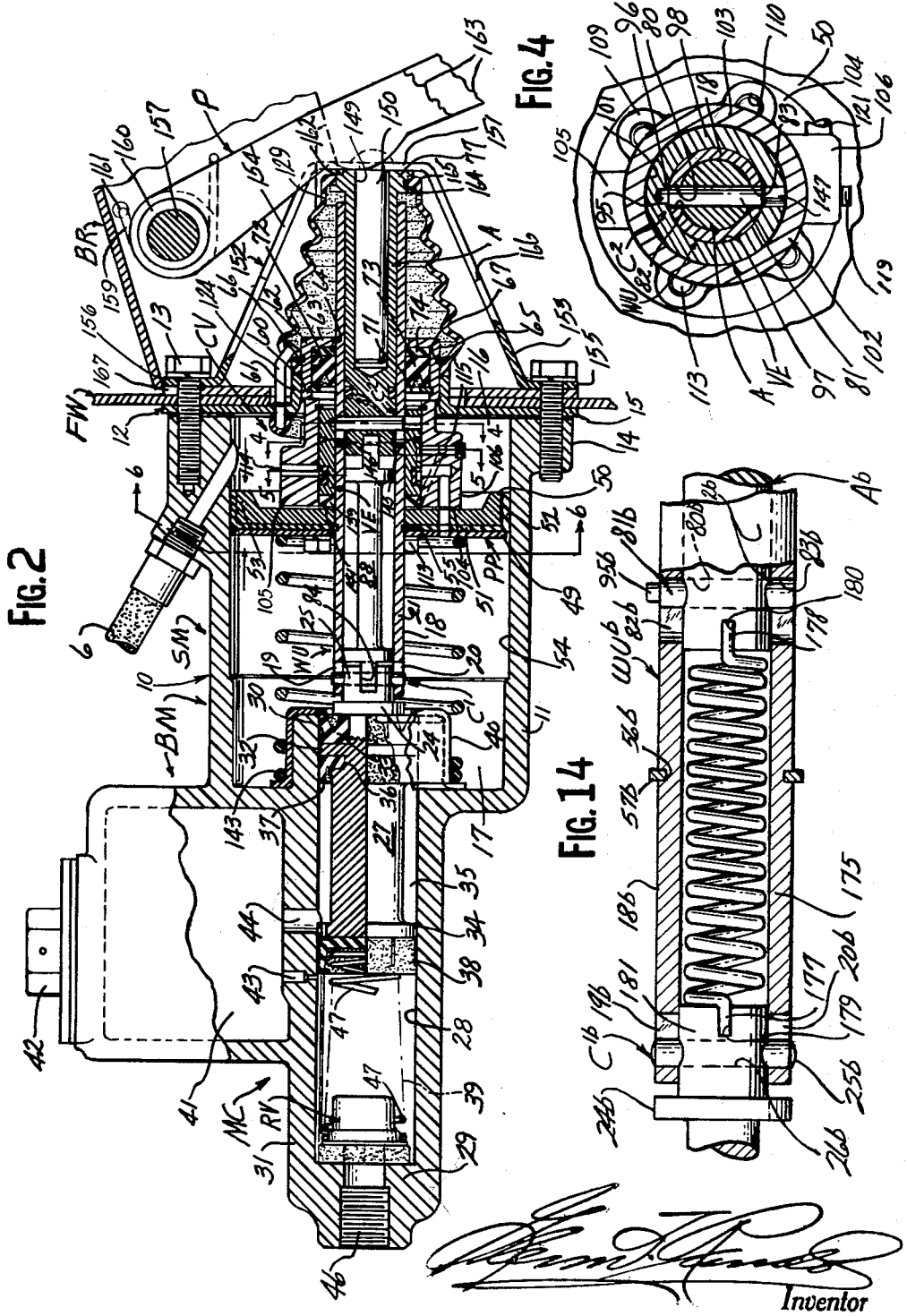

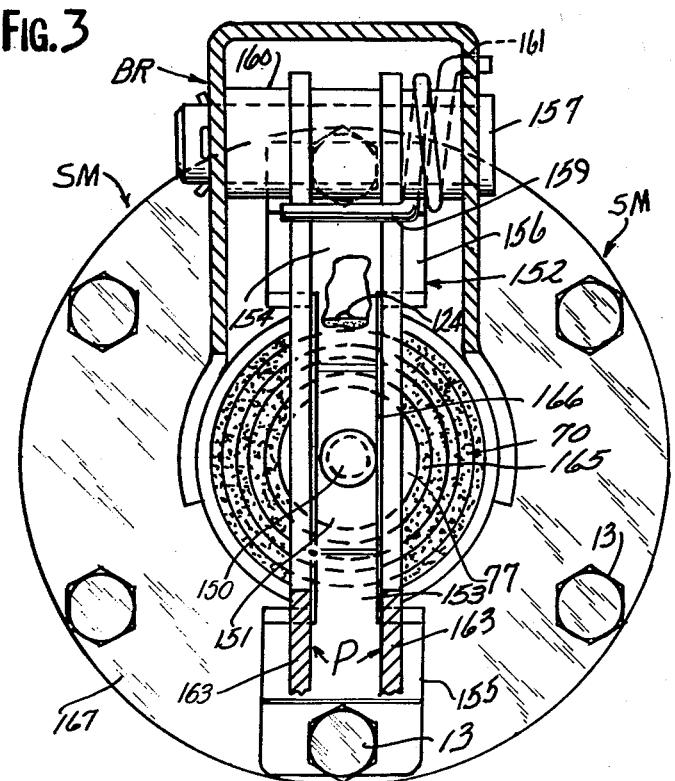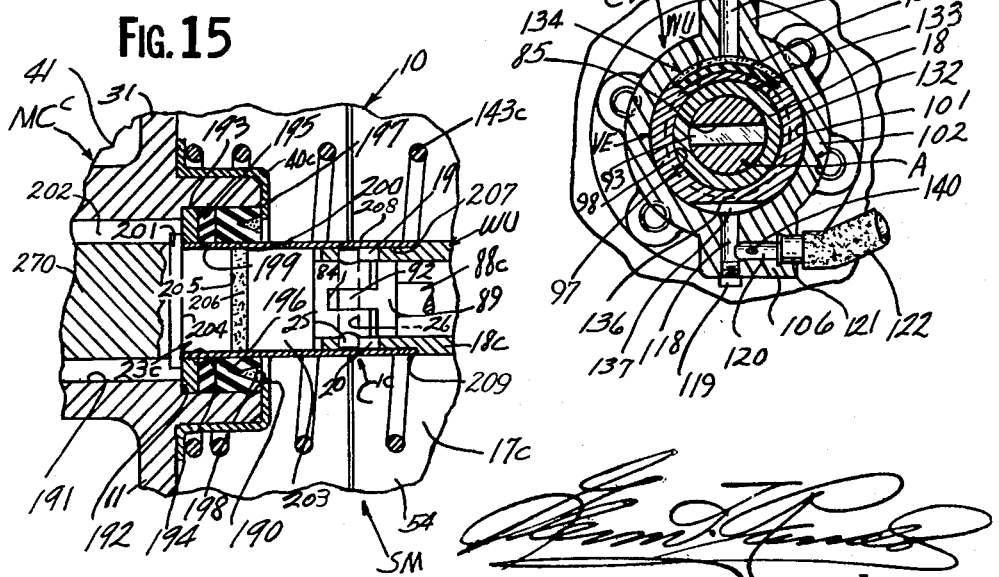

3,172,337
COMPRESSED-AIR OPERATED BRAKE
BOOSTER MECHANISM
Glenn T. Randol, 3 E. 2nd Ave., Loch Lynn,
P.O. Box 275, Mountain Lake Park, Md.
Filed July 17, 1962, Ser. No. 210,535
23 Claims. (Cl. 91—434)

This invention relates to a power unit for brake systems, and more particularly to a booster-type unit adapted to produce the major portion of the operating force to apply, for example, hydraulic brakes on automotive vehicles or the like, although it is obviously feasible for other applications characterized by operator follow-up control of the operation of said unit.

In the art of power-brakes, the problem of control to prevent over-sensitivity has received considerable attention, that is, to provide a predictable control which would enable the operator to have physical awareness of the condition of brake applications under all circumstances, and at the same time to possess the highly desirable characteristic of reduced operator effort through the full range of power-assistance. Some workers in the art have resorted to hydraulic reaction to provide a diminutive reactive force to the total effective pressure in the brake lines, others have employed resilient disc or lever mechanisms including various types of preloaded spring means reacting on the brake pedal, for "driver-sensing" of the operating condition of the power-assisting force, while most of them incorporate the aforementioned reactive principles by utilizing a master cylinder radically different from the conventional foot-operated types used in present-day motor cars and the like, preferably mounted on the vehicle firewall in the engine compartment for easy servicing; but none which interconnects the conventional master brake cylinder and a booster-type servomotor by an element characterized by torsional action about its longitudinal axis induced in part by reaction from said master cylinder, to provide the driver with diminutive reactive forces characterized by firmness as distinguished from resiliency which mechanical springs inherently produce, said more positive reactions being substantially proportional to the total actuating force applied to the fluid-displacing component in said master cylinder.

Therefore, the primary object of my invention is to advance the art by contributing a brake servo-mechanism (servomotor) of the last-mentioned type characterized by novel and improved work-performing means having an included torsional element such as, for example, an elongated bar subjective to "twisting" action inducible by counteraction of a pair of operatively associated actuatable members acting on opposite ends thereof respectively, and a valve element having a normal position of control establishable by reaction from said torsion element during its "untwisting" to normal relaxed status wherein said valve element is disposed in its normal position. One of said pair of members being operator-operated, and the other member being operatively associated with a work load such as, for example, the aforementioned master cylinder, whereby reaction from the latter is transmitted in part to the operator to enable him to sense the amount of work-applying pressure in effect at all operating positions of said work means. Thus, another object is to produce novel interaction and cooperation of the servo-mechanism and work-performing means as a function of the interconnection of said means with operator force and said opposing work load, effected by said interposed torsional element.

More specifically, my invention provides novel brake booster mechanism comprising a compressed-air operated servomotor combined with the conventional master cylinder in such manner that the movable power-piston in said servomotor, the fluid-displacing member in the master cylinder, and the operator-operated member (brake-pedal) are interconnected by a normally relaxed torsional element which is energized by "twisting-action" induced by opposing axial-rotational movements of an actuatable element influenced by said operator member, and another actuatable element influenced by said fluid-displacement member during braking applications, such energization of the torsional element opposing operation of the operator member to provide the operator with substantially proportional reaction or "feel" of the total reaction from the fluid-displacement member while under influence of both the servomotor and the operator member in a brake-applying direction.

In one embodiment of this invention, the torsional element is in the form of a cylindrical bar having its opposite ends slidably interconnecting the inner confronting ends of the two aforesaid actuatable elements for co-rotation therewith in opposite directions respectively, each of said confronting ends of the actuatable elements being provided with a cross pin which engages a cooperating spiral slot in a hollow work-performing element acted on by said power-piston to induce in part said opposed rotational movements of the torsional bar, the said operator member being capable of acting directly on said work-performing element upon the relative axial movements of said two actuatable elements being taken up, to enable operator force to operate said fluid-displacement member directly in the event of power inadequacy or failure completely.

In another embodiment, said torsional element is in the form of an elongated plate interconnecting the said two actuatable elements in the same manner as the first embodiment, and capable of being twisted to effect energization thereof for transmission of reaction from the fluid-displacement member to the operator member; and, in a third embodiment, the torsional element is a helically formed torsional spring with its opposite ends interconnecting the said two actuatable elements, said ends being capable of being rotated in opposite directions as a function of the aforesaid spiral slot and pin connections, to an energized twisted status for the transmission of reaction from the fluid-displacing member in the master brake cylinder to the operator member.

Another salient and novel feature of my invention is the novel utilization of a tubular work-performing element in which the said torsional element is wholly contained.

Another novel feature is the provision of improved control valve mechanism for controlling the power-piston of a servomotor operatable under influence of differential pressures effective on opposite sides of said power-piston as a consequence of varying the pressure on one side of said power-piston, the latter, for example, being normally super-atmospheric pressure suspended.

Another object related to the two features next above, is to utilize a novel sleeve-type valve element through which the tubular work-performing element freely projects thus avoiding angular forces which induce wear on said valve element and co-operating housing surface when operating the same, particularly following power-run-out necessitating direct engagement of the work element by the operator-operated member (pedal).

Still another important feature of this invention is the operation of said control valve element to its normal "off" position wherein pressures on opposite sides of the power-piston are balanced, through a mechanical connection with the torsion element whereby normalizing of the latter from its energized "twisted-status" operates the valve element to said normal position in response to removal of operator pressure from the aforesaid pedal, while operation of the valve element to operating "on"

position is effected by operator force in opposition to yieldable resistance of said torsional element to "twist."

Additional objects and advantages of the present invention will be apparent from the following description, reference being had to the accompanying drawing wherein different embodiments of the invention are exemplarily illustrated by the following figures:

FIGURE 1 is a side elevation of my novel brake booster mechanism constructed in accordance with the present invention, and exemplarily shown connected to operate the master brake cylinder in a hydraulic brake system conventionally used on automotive vehicles or the like, said mechanism being shown in normally released disposition wherein the vehicle brakes are "off";

FIGURE 2 is a longitudinal vertical section on an enlarged scale of the mechanism per se illustrated in FIGURE 1;

FIGURE 3 is a rear elevation of said mechanism showing particulars of the brake-pedal assembly and installation on the firewall of the vehicle;

FIGURE 4 is a transverse section taken along the line 4—4 on an enlarged scale from FIGURE 2 and showing particulars of the control valve and operating connection with the two-directional mechanical connection between one end of the reaction torsional bar and the work-performing element;

FIGURE 5 is another transverse section on the same scale as FIGURE 4 taken along the line 5—5 of FIGURE 2 and showing details of the fluid passageway system in the control valve;

FIGURE 6 is another transverse section taken along the line 6—6 of FIGURE 2 showing the variable pressure side of the power-piston assembly;

FIGURE 7 is an enlarged view partly in longitudinal vertical section of the tubular work performing element and operably associated torsion bar reactive means corresponding to the FIGURE 2 depiction thereof, said view being positioned 90° to normal position;

FIGURE 8 is a transverse section taken along the line 8—8 of FIGURE 7 to clarify details of the spiral slot and pin connection between the work-load element and work-performing element and associated coupling for imparting co-rotational movement of the work-load element and reactive torsion bar;

FIGURE 9 is a fragmentary view of FIGURE 2 on an enlarged scale showing particulars of the control valve mechanism in operating "on" disposition corresponding to energized status of the booster servomotor;

FIGURE 10 is a view similar to FIGURE 7 but showing the torsion bar reactive means under twisting energization corresponding to the operating disposition of the control valve mechanism in FIGURE 9;

FIGURE 11 is a view of the torsion bar per se;

FIGURE 12 illustrates a modified form of the torsion bar reactive means;

FIGURE 13 is a view of the torsion plate per se in FIGURE 12;

FIGURE 14 illustrates another form of the torsional reactive means; and

FIGURE 15 depicts a further modified form of the invention wherein a stationary seal assembly mounted on the master cylinder is substituted for the movable seal assembly carried by the work-performing element.

This invention has a particular use and value in connection with hydraulic brake systems on motor vehicles or the like having one of the known forms of master cylinders for activating such brake systems.

It will be understood from the description to follow that the cycle of operation and various features of the apparatus are clearly adaptable to other assemblies than the foregoing. This cycle relates to a brake application and release thereof including selective intermediate stages effective to "hold" the brakes on at any applied condition thereof, and wherein the apparatus may be cooperated with or completely bypassed by the operator automatically to apply the brakes.

In FIGURE 1, wherein the invention is applied to a conventional automobile, there is an engine-driven "compressor" connected to charge an "accumulator" with super-atmospheric pressure via a conduit 5 having an interposed "check-valve," said accumulator communicating with novel and improved differential pressure operated servo-mechanism (servomotor) "SM" via another conduit 6. Intersecting the conduit 5 between the compressor and check-valve, is a branch conduit 7 connected to a "pressure relief valve." The servomotor is operatively associated, for example, with the conventional master brake cylinder "MC."

Reference to FIGURES 1–8 of the drawing, shows the servomotor SM in the present invention as being the super-atmospheric pressure suspended type in normal disposition shown in FIGURE 2 and comprises a cylindrical casing 10 having an integral wall 11 at one end and a detachable member or wall 12 closing the other open end as by fasteners disclosed herein as a plurality of cap screws 13 which secure together complemental circular flanged portions 14, 15 integral with the open end of the cylinder and latter wall respectively as shown. A power-piston "PP" is reciprocably mounted in the cylinder 10, and normally occupies the position of FIGURE 2 with pressures on opposite sides thereof balanced. The power-piston, which for flexibility of terminology in describing this component, may also be referred to as a power "member," "wall," or "assembly," and which divides the interior of the cylinder 10 into a constant super-atmospheric pressure chamber 16 and a variable pressure chamber 17, the former chamber having continuous communication with said accumulator via an angular passage formed in the cylinder wall 11 and the connected conduit 6 as shown in FIGURES 1 and 2.

Therefore, the brake booster mechanism designated as a whole "BM" comprises the booster servomotor SM in operative association with the aforesaid master cylinder MC of conventional construction and operation and which is preferably shown integrated with the wall 11 to provide the supply of pressurized fluid to the vehicle brake system to actuate the same.

The power-piston which is generally designated "PP" actuates in part a composite work-performing unit "WU" comprising an elongated tubular work element 18 having a pair of diametrically disposed oppositely angulated spiral slots 19, 20 incorporated at the forward end through the cylindrical wall 21 thereof. The rear end portion 22 of a thrust member or plunger 23 slidably projects into the forward end of the tubular element 18 to a position normally overlapping the pair of slots 19, 20 associated with that end, said plunger having an integral annular flange 24 normally spaced from the forward end of the work element 18, a cross pin 25 pressfitted through or otherwise secured in a crossbore 26 to extend through the spiral slots 19, 20 to provide an operative pin-and-slot connection $C^1$ between said rear end of the plunger 23 and forward end of the work element 18. The forward end portion of the plunger 23 terminates in the form of a fluid-displacing member herein disclosed as a spool-type piston 27 slidably interfitting a longitudinal bore 28 closed at one end 29 and open at the other (inner) end 30 in the cylindrically walled portion of the body 31 of the master cylinder MC, said piston comprising an annular fluid-retaining flange 32 of larger diameter than flange 24 spaced therefrom, an annular double-lip pliant seal 33 occupying the space between said flanges, an annular head 34 spaced forwardly from said fluid-retaining flange to define an annular fluid space 35 therebetween, an externally annular groove 36 at the rear of said fluid space adjacent said fluid-retaining flange, an annular single-lip fluid-retaining seal 37 engaging said groove, an annular cup-like pliant seal 38 engaging the forward face of the head 34, a variable volume fluid working chamber 39 disposed in the bore 28 between the closed end thereof and confronting head seal 38, to supply brake fluid under pressure to the brake system of the motor vehicle as is understood.

The cylindrical wall of the longitudinal bore 28 extends rearwardly from the inner side of the end wall 11 as a hub into chamber 17. Telescopically fitted onto this hub is a cup-shaped member 40 coextensive with said hub, and comprises a centrally apertured end wall through which said work element 18 freely passes, and the open end thereof terminates in an outstanding circular flange contiguous to the inner confronting face on the end wall 11 adjacent its juncture with said hub. The inner face of the apertured end wall engages the end of said hub in confronting relationship to the outer lip of the aforesaid seal 33 to serve as an abutment therefor to establish the fully retracted position of the master cylinder piston 27 as shown in FIGURE 2. The flanged portion of the abutment member 40 is under influence of spring pressure to stabilize the said member in the position shown.

A fluid supply reservoir 41 having a vented filler cap 42, is provided in the body 31 of the master cylinder to supply fluid under gravitational force, or otherwise, to said bore via a compensating port 43 controlled by the head seal 38, and an inlet port 44 in continuous communication with said annular fluid space 35, to enable adjustment of fluid volume in said working chamber 39 to accommodate full release of the vehicle brakes without incurring cavitation in the brake lines 45 which interconnect the wheel cylinders and the latter to the master cylinder as shown in FIGURE 1, two of said wheel cylinders being illustrated at "WC," and shown in operative association with the conventional shoe-type brake.

Incorporated at the closed end 29 of the bore 28 is the conventional residual pressure and discharge check-valve "RV" associated with a discharge port 46 through said closed end and connected to said lines 44, and a normally preloaded spring 47 is operably disposed in said working chamber 40 to react between said head seal 38 and residual valve RV to maintain the former in contact with the head 34 and to control the action of the residual valve RV to establish a minimum line pressure when the brakes are "off," said return spring also serving to bias the piston 27 and connected work element 18 to normal disposition as shown in FIGURE 2.

The power-piston PP comprises a pair of juxtaposed circular plates 49, 50 with an interposed annular packing 51 having a rearwardly extending horizontal peripheral portion 52 overlying a complemental support portion 53 defining the outer periphery of plate 50, in intimate contact with the finished interior surface 54 of the cylinder 10. The plates and packing are provided with coaxial circular openings as shown with the opening 55 in the packing of larger diameter than the openings through the plates as shown in FIGURE 2. The work element 18 extends through the said openings and is provided with an annular external groove 56 engaged by a split locking ring 57 impinged between the confronting marginal portions defining the openings in the plates in circular alignment with the larger opening in the aforesaid packing whereby means is provided to lock the power-piston PP to the work element 18 for movement as a unit in airtight sealed relation. An O-ring seal (not shown) may be incorporated in the opening of plate 50 through which the work element would pass and thereby insure that the seal between the plates and work element is airtight so that seepage between the servomotor chambers 16, 17 could not possibly occur when differential pressures are effective on opposite sides of the power-piston PP for power-activation thereof.

A central circular opening 60 is provided through the closure wall 12, said opening terminating in a horizontal circular flange 61. A cylindrical cup-shaped member 62 having a vertical wall 63 provided with a central circular opening 64, and a cylindrical wall 65 normal to said vertical wall, the open end of said cylindrical wall being interfitted with the flanged opening 60 and made rigid therewith as by welding as shown. An external annular split ring 66 engages a complemental annular groove 67 in the outer surface of the cylindrical 65 in spaced relation with respect to the confronting end of the circular flange 61 to provide an annular space 68 therebetween for reception of a retaining annular bead 69 forming the larger end of a flexible protection boot 70. Adjacent the open end of the cylindrical wall 65 is a split retaining ring 71 which engages an annular groove in the interior surface of said cylindrical wall to provide with the interior of said vertical wall 63 an internal annular space 72 which receives in juxtaposed relation an annular double-lip packing 73 and an annular packing 74 of D-shaped cross section.

That portion of the work element 18 extending to the rear beyond the thrust plate 50, projects through a sleeve-type valve element "VE," thence through the aforesaid packings 73, 74 and central opening 64 in the vertical wall 63 to the exterior of the closure wall 12 in that order.

Slidably projecting into said rear portion of the work element 18, is a cylindrical actuator "A" which is operator-operated, and has its outer end formed as an annular flange 77 normally spaced from the rear end of the tubular element. The inner end portion of the actuator A is provided with an external annular groove 78 which receives a complemental annular packing 79 in sealing relation with the inner cylindrical surface of the work element. Forwardly spaced from said packing is a cross bore 80 through which a cross pin 81 is pressfitted or otherwise secured therein, said pin projecting at its opposite ends through another pair of diametrically disposed oppositely angulated spiral slots 82, 83 through an intermediate portion of the wall of said work element 18 in confronting longitudinally spaced relationship with respect to slots 19, 20 at the forward end of said work element, said pin and slots producing another pin-and-slot connection designated $C^2$ between the inner end portion of the actuator A and said intermediate portion of the tubular element 18 circularly aligned therewith.

As best demonstrated in FIGURES 2 and 6, the confronting ends of the plunger 23 and the actuator A are cross slotted at 84, 85 respectively, and interconnecting said plunger and the actuator A is a torsion bar 88 formed with a pair of longitudinally spaced annular flanges 89, 90 interconnected by an elongated cylindrical element 91, said flanges being adapted to slidably and rotatably interfit the interior surface of the wall of the work element 18. Projecting from said annular flanges, are integral rectangular extensions 92, 93, respectively, which slidably engage the slots 84, 85 respectively to effect positive rotational coupling of the torsion bar 88, plunger 23 and actuator A as shown in FIGURE 7 whereby opposite rotational movements generated by said connections $C^1$ and $C^2$ to said actuator A and plunger 23 induced by operator force initially applied to said actuator and subsequently opposed by reaction from said plunger 23 under joint influence of said actuator and power-piston PP, exert a twisting deformation of the torsion bar 88 about the axis of the element 91, and thereby energize the same to transmit reactive forces from the hydraulic piston 27 to the actuator A during power-assist by said booster motor SM, the ends of said extensions 92, 93 being normally spaced from the bottoms of their respective slots 84, 85 in the plunger 23 and actuator A respectively, to accommodate relative axial movement of the latter components with respect to the tubular member 18 while at the same time twisting the torsion bar 88. An end slot 94 is provided in extension 92, to receive pin 25, and thereby accommodate relative axial movement of the plunger 23 with respect to that end of the torsion bar when reaction occurs on said plunger without interrupting the positive rotational coupling therebetween.

One end of the pin 81 is provided with a reduced diameter extension 95 which engages a suitable recess 96 in the interior surface 97 of the cylindrical wall 98 of the valve element VE whereby axial movement of the actuator A is transmitted to correspondingly move the valve element VE from its normal "off" position to its operating "on" position, the circular length of the recess 96 determining whether or not the valve element rotates with the pin 81 or said pin imparts axial movement only to the valve element.

The follow-up control valve mechanism generally designated "CV" includes the aforesaid valve element VE slidably interfitting the smooth cylindrical surface of a bore 101 provided through a housing 102 of generally cylindrical configuration. The valve housing 102 comprises a longitudinal circular wall 103 which terminates at its inner end in an outstanding circular mounting flange 104 best demonstrated in FIGURES 4 and 5, a pair of elongated circumferentially spaced embossments 105, 106, and an internal annular groove 107 in the bore 101 adjacent the outer end thereof engaged by a split type stop ring 108. The outer end of the housing normally engages the confronting inner end of the cylindrical wall 65 of the cup-shaped member 62 fixed to the closure wall 12 as shown in FIGURE 2, to establish the normal disposition of the power-piston PP and associated control valve CV. Projecting rearwardly from the outer face of the mounting flange 104 is a plurality of semicircular embossments 109 (preferably four in number) integrated with the housing wall 103. These latter embossments are provided with threaded holes 110 which align with unthreaded holes 111 through the piston plates 49, 50, piston packing 51 and an annular gasket 112 between plate 50 and mounting flange 104, for reception of cap screws 113 as shown in FIGURE 6 to join the valve housing 102 and power-piston PP in a coaxial airtight assembly for movement as a unit.

The valve housing 102 includes a radial passageway 114 through the embossment 105 interconnecting chamber 16 with the valve bore 101, and another radial passageway 115 through the embossment 106 leading to said bore 101 and closed at its outer end. A longitudinal passageway 117 is provided through the power piston plates 49, 50 into said embossment 106 a sufficient distance to intersect the passageway 115 and thereby interconnect the chamber 17 with the bore 101 in the valve housing 102.

A third radial passageway 118 is provided through the embossment 106 in communication with the bore 101, said latter passageway being spaced from the passageway 115 in parallel relationship thereto, and the outer end thereof being closed as by a threaded plug 119, and a transverse passageway 120 is provided in the embossment 106 to intersect the passageway 118 to place the same in continuous communication with the atmosphere. A rigid tubular fitting 121 is incorporated in the embossment 106 as shown in FIGURES 4 and 5 to interconnect said passageway 120 with a flexible conduit 122 leading to the inner end 123 of a tubular fitting 124 projecting through a hole 125 in the wall 12 and made rigid therewith as by soldering, the outer end of fitting 124 having a downturned flared terminating portion 126 which projects through a hole 127 in the boot 70 provided with a circular reinforcing bead 128 whereby air pressure in chamber 17 of the servomotor SM is exhausted therethrough under control of the valve element VE into the interior of the boot 70 and thence to atmosphere via a plurality of vent holes 129 in the boot to silence movement of the air under pressure from the chamber 17 during operative energization of the servomotor SM to be more fully explained hereinafter. Since the fold of the boot 70 through which the fitting end 126 projects defines the larger end of the boot, this fold is substantially stabilized in the position shown irrespective of the collapsed condition of the boot corresponding to the operating disposition of the work element 18 under influence of the power-piston PP during power-assist thereby. Accordingly, the flexible conduit 122 and fittings 121, 124 interconnected thereby produce what may be termed the pressure exhaust pipe, and, as the disclosure shows, the conduit 121 accommodates movement of the power-piston PP relative to the cylinder 10 so that the pressures within the chambers 16, 17 may be balanced at will to release the vehicle brakes.

The sleeve-type valve element VE includes the aforesaid smooth inner cylindrical bore 97 through which the work element 18 passes in sliding contact therewith or with slight clearance therebetween, a pair of annular lands 131, 132 defining the major diameter which slidably engages the finished surface of the housing bore 101 in airtight sealed relation therewith, said annular lands being spaced to define an external annular groove 133 therebetween and equipped with an annular pressure-sealed packing 134 having an annular fluid channel 135 with the passageways 114, 115 normally connected thereby, a cross-slot 136 spaced rearwardly from said channel to provide a working segment 137 therebetween normally communicating with the passageway 118, said working segment being adapted to selectively connect the cross-slot to passageway 118, and the latter passageway to the passageway 115 upon the control edge 138 on land 132 isolating passageway 114 from channel 135, said edge normally interconnecting said passageways 114, 115 via channel 135 to balance pressures within the servomotor chambers 16, 17 as shown in FIGURE 2. An annular atmospheric chamber 139 is disposed between the land 131 and confronting face portion on the piston plate 50, and is continuously vented to atmosphere via a passageway 140 in the valve housing, and which intersects the passageway 120 to prevent compressive effects resulting from sliding action of the valve element. In this latter chamber, there is disposed a Belleville spring 141 normally under pre-tension and reacting between the face portion on the piston plate 50 and inner confronting end of the valve element to bias the latter toward its normally released position shown in FIGURE 2. However, as previously mentioned, the valve element VE is connected for movement in unison with the pin 81 under influence of the actuator A toward operating "on" position and under influence of the normalizing action (untwisting) of the torsion bar 88 in the opposite direction to place the valve element in normally released "off" position. Therefore, the Belleville spring 141 is not essential to restoration of the valve element to normal FIGURE 2 disposition when the extension 95 is confined in the recess 96 as shown since the valve element and pin 81 move in unison in both directions, but if the recess is converted into a shoulder whereby the extension 95 engages the same in a valve operating "on" direction of movement, then the Belleville spring 142 would function to bias the valve element toward its normally released position. It is, therefore, desired to make clear that the invention contemplates utilization of the pin 81 alone to dispose the valve element in its closed and open positions, or in the case of the pin having only a one-way direction of movement against the valve element to operating "on" position, the Belleville spring 141 would serve to return the valve element to its "off" position wherein superatmospheric pressures in the chambers 16, 17 are balanced to thereby enable the power-piston PP to assume its normally released position shown in FIGURE 2 under influence of a normally preloaded spring 143 operably disposed in the chamber 17 to continuously react between the outstanding flange on the cup abutment member 40 contiguous to the end wall 11, and the power-piston PP, to oppose pressure differential operation of the latter, and also, to stabilize the said abutment member on the aforesaid hub defining the open end 30 of said bore 28 in the master cylinder MC, and the power-piston and connected tubular element 18, against rotational movement, said spring being centered at one end by the circularly spaced heads of the cap screws 113, and the opposite (forward) end thereof maintained in correct working alignment by the cylindrical body portion of said abutment member, all as shown in FIGURE 1.

In the normal disposition of the valve element VE as shown in FIGURE 2, the stop ring 108 is engaged by the outer end of the valve element, and it should be importantly noted that the inner end of the valve element is never brought into engagement with the confronting face portion on the piston plate 50 due to the outer end of the tubular element 18 being normally spaced from said annular flange 77 which terminates the outer end of the actuator A, said spacing being such as to accommodate operation of the valve element to wide open position whereat the flange 77 engages the confronting outer end of the work element 18 prior to the inner end of the valve element coming into engagement with the confronting face portion on the piston plate 50. Accordingly, when the flange 77 so engages the tubular element 18 a "straight-through" operation of the work element 18 is effected directly by operator effort in cooperation with power-assist from the servomotor or independently thereof in the event of power failure.

An annular groove 145 is incorporated in valve land 132, and which is fitted with a lapped end piston ring 146 to insure an effective seal with the valve housing bore 101, and a hole 147 is provided through the wall of this valve land rearwardly of said piston ring, through which the pin 81 is assembled on the actuator A with the reduced extension 95 on the pin inserted into the recess 96 as shown, the opposite full diameter end of the pin 81 is installed substantially flush with the outer diameter of the work element 18 clear of interference with relative movement of the valve element VE (see FIGURE 2). An angular slot 148 is provided in the valve housing to extend the width of the passageway 114 adjacent the bore 101 to maintain this passageway in communication with the fluid channel 135 at all operating positions of the valve element notwithstanding passageway 115 is closed by such operating positions and connected to the cross-slot 136.

The actuator A has a blind axial bore 149 extending from its outer end as shown in FIGURE 2, and slidably interfitting this bore a sufficient depth is a support rod 150 adapted to slidably support the work element, actuator A and control valve CV in coaxial disposition with respect to the power-piston PP. The outer reduced end of rod 150 is rigidly anchored in horizontal disposition as by peening it in a hole in a vertical segment 151 of a horizontally disposed V-shaped member 152 having diverging extensions 153, 154 provided with oppositely outturned legs 155, 156 respectively. An operator-operated member or pedal "P" is pivotally suspended at its upper end on a cross shaft 157 supported at opposite ends in an inverted U-shaped bracket "BR." A normally preloaded torsional spring 159 encircles a tubular shaft 160 through which said cross shaft projects, with opposite ends of said spring reacting on the bracket at 161 and on the pedal as shown, to maintain arcuate working portions 162 on two parallel pedal arms 163 which terminate at their lower ends into a foot pad as shown in FIGURE 1, in engagement with the outer face of the said actuator flange 77, said flange having an external annular groove 164 which receives an annular bead 165 terminating the smaller end of the boot 70 to thereby close the exposed portions of the work element 18 and actuator A within the flexible folds of said boot. The pedal arms 163 straddle the V-shaped member 152 as shown in FIGURES 1 and 3, and the extensions 153, 154 are reduced in width at 166 through that portion to accommodate the full swing of the pedal. It should be noted that the pedal spring 159 is of less strength than the power-piston return spring 143, to enable the latter spring to reset the pedal and power-piston PP in their respectively normally released positions as shown in FIGURES 1 and 2.

The pedal bracket assembly BR is mounted on the firewall "FW" of the vehicle by the cap screws 13 which project through a like number of holes in a circular plate 167 to which the forward end of the pedal support bracket is attached as by welding or otherwise, with two of the cap screws first passing through holes in the legs 155, 156, thence through aligned holes in the firewall and flange 15 of the closure wall 12, into threaded engagement with the holes in the flange 14 integral with the open end of the servo cylinder 10, to effect a unitary assembly of the pedal mechanism P, and the booster servomotor SM on the firewall of the vehicle, in operating position.

*Operation*

The manner in which my improved compressed-air operated brake booster SM functions is believed manifest from the foregoing description. However, in the interest of further clarifications a more detailed consideration will be given to its operational cycle as follows:

The normal disposition of the parts is displayed in FIGURES 1 and 2 wherein the booster chambers 16, 17 are charged with compressed air from the "accumulator" via conduits 5 and 6, the former conduit has the interposed "pressure regulator," chamber 16, passageway 14, channel 135, passageways 115, 117, and thence into chamber 17 whereby the power-piston PP is super-atmospheric pressure suspended enabling the piston return spring 143 to establish normal position of the power-piston as shown in FIGURE 2. Also, it should be noted that the working segment 137 on the valve land 132 is isolating the passageway 118 from the channel 135 and the latter is normally interconnected by the passageways 114, 115. The aforesaid conditions may be termed the "released" position of the booster mechanism BM wherein pressures are balanced therein.

If it is now desired to operatively energize the booster servo SM, for power-assist operation of the master cylinder MC to apply the brakes, the operator would actuate the pedal P which in turn acts of the actuator A through its flange 144 engaged by the working portions 162, such operator force being transmitted to the pin 81, associated spiral slots 82, 83 to move the power and master cylinder pistons PP and 27, respectively, as a unit to take up the slack in the vehicle brake system therefore lightly applying the vehicle brakes under initial operator-actuation of said pedal. Such unitary movement of the two pistons PP and 27 being induced by the resistance of the torsional element 88 to "twisting" from its normally relaxed status shown in FIGURE 7, especially the right end portion of said torsional element which is adapted to move the control valve element VE into operating "on" position. Upon the slack in the brake system being taken up sufficiently to provide resistance of such magnitude as to cause the master cylinder piston 27 to become substantially stationary therefore the power-piston PP, due to the column of non-compressible brake fluid reacting thereagainst, the work element 18 becomes axially impinged between the thrust member 23 and the actuator A; whereupon, additional operator force applied to the brake-pedal P is effective via operative connection C² to convert relative axial movement of the actuator A into relative rotational movement thereof with respect to the work element 18 and thereby imparts like movements to the control valve element VE through the pin extension connection 95, 96 therewith to dispose the control valve element in operating "on" position portrayed in FIGURE 9 for admitting atmospheric pressure into chamber 17 to create differential pressures effective to move the power-piston PP to assist in applying the vehicle brakes. During the aforesaid axial-rotational movements of the actuator A, the right end portion of the torsional element 88 is correspondingly rotated (twisted) to pre-energize the same, and at the same time reaction from the master cylinder piston 27 being transmitted to the pin 25 and associated spiral slots 19, 20 effects counter-rotation of the left end portion of the torsional element 88 as shown in FIGURE 10 for reaction transmission from the master cylinder piston 27 to the pedal P to provide the operator with "feel" of the amount of operating force being applied to the piston 27 so that he can predictably control the amount of braking effort required under the particular conditions.

Movement of the control valve element VE from FIGURE 2 to FIGURE 9 position places the control edge 138 on the valve land 132 in lapping relationship with respect to the passageways 114, 115 and connects the cross-slot 136 to the passageway 115 without interrupting communication of the slot with the passageway 118, and therefore, the super-atmospheric pressure in chamber 17 is controllably vented to the atmosphere through the passageway 117, slot 136, passageways 118, 120, flexible conduit 122 and exhaust pipe 124 through the interior of the flexible boot 70 and out vent holes 129 therein to the exterior of said boot. In this manner a differential pressure is established on opposite sides of the power-piston PP in chambers 16, 17 since chamber 16 is continuously energized with a uniform compressed air condition while in chamber 17 under the above circumstances of control, the pressures are varied, that is, reduced to energize the power-piston PP in accordance with the work load to be performed. Maximum pressure differential force that can be exerted on the power-piston PP occurs when pressure in chamber 17 is at atmospheric level. This completes what may be termed an "operating" stage of the booster mechanism BM whereby the master cylinder MC is operated to energize the wheel brake cylinders WC as is understood.

During the aforesaid relative axial-rotational movements imparted to the actuator A by the pin-and-slot connection C², the torsion bar 88 is given an initial energization induced by the work element 18 encountering a predetermined resistance to movement best demonstrated in FIGURES 9 and 10. This initial "twisting" action is effected in the direction indicated by the arrow on the end portion of the torsional element, from the operator's viewpoint, and which conditions the torsion bar 88 to transmit reaction of greater magnitude to the actuator A from the plunger 23, and, upon such predetermined resistance becoming effective on the work element 18, thrust reaction from the energized power-piston PP becomes transmittable by the torsion bar 88 via the pin 25 and connected end of the plunger 23 to the actuator A to cause these two connected elements to move relatively to the forward portion of the work element 18 as a function of the pin-and-slot connection C¹ to additionally "twist" the torsion bar in a counter-direction indicated by the arrow at the forward end portion of said bar as shown in FIGURE 10, to transmit reaction from the plunger 23 therefore the master cylinder piston 27 via said connections C¹ and C² and interposed torsion bar to the actuator A to provide the operator with physical perception of the total amount of operating force being applied jointly by him and the servo SM to operate the master cylinder MC and therefore the vehicle brakes. Accordingly, my novel application of a torsion bar to interconnect the operator-operated actuator A and plunger 23 via the work element 18 produces the previously described novel composite torsion reaction means. The degree of reaction transmittable by the bar 88 is a factor of the combined specification of the length, diameter and metallurgical characteristic of the bar used. Upon power-run-out of the booster servo SM the transmission of reaction from the plunger 23 becomes substantially constant due to engagement of the forward end of the work element 18 with the flange 24 which relationship also obtains upon the flange 77 on the outer end of the actuator A being brought into engagement with the outer end of the work element 18 to enable "straight-through" operation of the master cylinder MC from the pedal P. Accordingly, when spatial separation of the flanges 24 and 77 with respect to opposite ends, respectively, of the work element 18 is fully taken up, the operator is capable of directly operating the piston 27 in the master cylinder MC in normal manner with some increase in the amount of effort required over that normally used when power-assist is not associated with such master cylinders. This increase in effort is brought about by the operator having to overcome the frictional drag of the power-piston and the bias from return spring 143, and resistance of the torsion bar 88 in maximum energized condition.

With the booster servo SM energized in the manner above-described, if the operator desires to de-energize the same, he need only to remove foot pressure from pedal P which enables the spring 143 and torsion bar to relax and thereby return the power-piston PP and valve element VE to their respective normal positions shown in FIGURE 2. This resetting of the mechanism to normal position is aided by the reaction from spring 47 in the master cylinder, and the torsional spring 159 associated with the pedal P being of less strength than the combined reactions from the springs 47, 143 and torsion bar 88, offers only minor assistance to such normalizing of the mechanism as shown in FIGURE 2.

Further considering the operational behavior of the torsion bar reaction means, it is important to note that the aforesaid opposite rotational movements of the actuator A and plunger 23 relative to the work element 18, are induced by the pin-and-slot connections C² and C¹ at opposite ends, respectively, of the torsion bar 88, and which connections join said ends to the confronting ends of the actuator A and plunger 23, respectively, best shown in FIGURE 7. However, upon initial operator-actuation of the pedal P therefore actuator A, the pin-and-slot connections aforesaid become effective to "twist" the torsion bar 88 from opposite ends in opposite directions as shown by the two arrows applied to the torsion bar depicted in FIGURE 10 whereby connection C² becomes operative to "twist" the connected end of said torsion bar as a function of the angular slots 82, 83 actuating the associated pin 81 and simultaneously displacing the control valve element VE from its normal position of control wherein pressure in the servo chambers 16, 17 are balanced, to operating "on" position of control wherein differential pressures are effective on said power-piston PP to move the same. It is important to note that during initial energization of the torsion bar and aforesaid displacement of the valve element VE, that the pin 25 associated with the connection C¹ substantially stabilized at the left end of its cooperating slots 19, 20, as shown in FIGURE 7, but upon the plunger 23 being acted on by the operatively energized power-piston PP through said connection C¹ associated with said work element 18, the hydraulic piston 27 is correspondingly advanced into the bore 28 of the master cylinder MC to more firmly pressurize the brake fluid in the working chamber 39 with a corresponding increase in the amount of reaction on the piston-plunger 27, 23, respectively, thus activating the pin 25 to rotate to the position of FIGURE 10 as a function of its coaction with the cooperating slots 19, 20. In this manner, the torsion bar 88 becomes additionally "twisted" in opposition to the "twisted" status thereof induced from its opposite (rear) end in response to operator force initially applied to the actuator A. And, as previously explained, the rectangular extensions 92, 93 defining opposite end portions of the torsion bar are normally spaced from the bottoms of said slots 84, 85, respectively, in the plunger 23 and actuator A, to accommodate such relative axial movements of said plunger and actuator, with respect to the work element 18. It is the positive rotational coupling of the extensions and slots that effect corresponding rotational movements to opposite ends in opposite directions, respectively, of the torsion bar 88.

In the normal disposition of the mechanism shown in FIGURES 2 and 7, the torsion bar 88 is in normally relaxed condition, and since opposite ends thereof are coupled to the confronting ends of the plunger 23 and actuator A, respectively, for co-rotational movements, the pin-and-slot connections C¹ and C² operatively associated with the work element 18 induce corresponding normal or what may be termed "neutral" positioning of the valve element VE wherein pressures on opposite sides of the power-piston PP are balanced for power-inactivation of the servo SM wherein the vehicle brakes are released (off), and the associated master cylinder MC fully retracted; but when power-activation is desired to operate the master cylinder MC to pressurize the brake fluid, and thereby apply the vehicle brakes, the pedal P is depressed from its normal position shown in FIGURE 1 to operating positions such as displayed by the first dashed line position of the pedal in this same figure and corresponding to the full line position of the pedal in FIGURE 9. Initial depression of the pedal imparts a twisting action to the torsion bar and simultaneously discplaces the valve element VE to its operating "on" position shown in FIGURE 9, and, as the operator stops applying effort to the pedal and then relaxes it, the valve element VE is forced back to its normal "off" position displayed in FIGURE 2 by the "untwisting" of the torsion bar 88. As previously pointed out in the structural description of the invention, the Belleville spring 141 serves to cooperate with the "untwisting" of the torsion bar with the pin extension 95 and recess 96 connection as shown, but if the right wall of this recess is removed leaving only its forward shoulder engageable by said extension 95, then the "untwisting" of the torsion bar would be ineffective to force the valve element VE back into its normal disposition, and therefore, the Belleville spring 141 would perform this function while the pin extension 95 would displace the valve element VE to its operating position shown in FIGURE 9 in opposition to the reaction from said Belleville spring. In the case where the connection 95, 96 is utilized as shown in FIGURE 2, then the Belleville spring may be eliminated without impairing the operativeness of the control valve CV. However, in this latter case it is important to note that the air pressure which is substantially constant in servomotor chamber 16, continuously acts on the outer end surface area of the valve element VE tending to force the valve element toward its displaced operating position shown in FIGURE 9, due the opposite end of the valve element being in continuous communication with atmosphere via atmospheric chamber 139, passages 140, 120, conduit 122, interior of the boot 70 and thence through atmospheric vent holes 129 in the smaller end of said boot. In view of this condition, the Belleville spring 142 serves in cooperation with or independently of the torsion bar 88 to counterbalance this pressure on the end of the valve element so that activation of the valve element to control differential pressures in the servomotor, chambers 16, 17 is effected solely by the pin 81 connected to the valve element. This pressure reaction on the outer end of the valve element is proportional to the exposed surface defining this end of the valve element, but since this surface is relatively small as compared to the total working surface on the power-piston PP exposed to chamber 16, such diminutive pressure reaction on the valve element would not operate to impair the controllability of the latter under operator influence. In either case, however, such pressure reaction on the valve element is incapable of twisting the torsion bar, therefore fortuitous activation of the control valve CV by air pressure present in servo-chamber 16 cannot occur without assistance from the personally-operated actuator A.

The torsion bar 88, therefore, provides resistance to initial pedal movement to activate the power-piston PP by twisting action in one direction induced by the pin and slot connection C² alone, but upon the power-piston PP becoming operatively energized, the reaction from the spool-type piston 27 and plunger 23 rotates these two components in an opposite direction relatively to the pedal induced rotation, to impart additional twisting action to the torsion part and thereby produces increased reaction on the actuator A and connected pedal P whereby the torsion bar functions to transmit a progressively increasing reactive force against the pedal P simulating proportional hydraulic reaction provided in master cylinders having a pair of telescopically-related pistons, with the smaller piston acted on by the brake pedal, and the larger piston by the power member in the booster servo of commercially used types. During energization of the torsion bar 88 in the manner just described, thrust transmitted by the actuator A is simultaneously directed along two paths to the plunger 23 therefore the hydraulic piston 27; namely, (1) directly through the torsion bar to the plunger 23, and (2) via the connections C¹ and C² and interconnecting work element 18 to said plunger.

It is obvious from the disclosure that the torsion bar 88 may be installed with selected degrees of resistance to "twisting," that is its specification and design would be such as to require different magnitudes of operator and booster thrust to impart "twisting" action from opposite ends of said bar to energize for transmitting reaction from the master cylinder MC. Accordingly, if relatively light effort is required, initial depression of the brake pedal would apply a lateral force through connection C² to rotate the torsion bar from that end abut its longitudinal axis, while the forward end is held fast due to its interconnecting pin 25 being stabilized at the forward ends of the oppositely angulated slots 19, 20. Under these conditions, combined reaction from the power-piston return spring 143 and the return spring 47 for the piston 27, would be greater than the force required to cause the torsion bar to yield (twist), therefore the control valve element VE would move to its operating "on" position as shown in FIGURE 9 to induce operation of the power-piston PP; but if the installed strength of return springs 47, 143 is less than the amount of initial operator force applied to the actuator A to "twist" the torsion bar, then initial pedal movement would through the interposed torsion bar normally relaxed, effect unitary movement of the control valve element VE, power-piston PP and fluid-displacing components including the tubular working unit WU, to take up the slack in the brake lines, whereupon additional operator force applied to the actuator A opposed by the non-compressible column of brake fluid, would induce rotation of the connected end of the torsion bar and simultaneously operate the control valve element to open position to energize the booster servo. Upon the booster servo becoming operatively energized, the forward connection C¹ would effect rotation of the forward (left) end of the torsion bar under reaction from the master cylinder piston 27 thereby transmitting to the actuator A therefore pedal P, a reactive force for the operator's guidance in developing the required working pressure in the brake lines to produce the braking effect desired. From the foregoing, it is seen that if springs 47, 143 are initially overcome by the resistance of the torsion bar to "twisting," the master cylinder piston 27 and power-piston PP are initially moved as a unit from normal relative positions as shown in FIGURE 2 and thereby effect brake shoe-to-drum contact, by operator force alone followed by power-assist from the booster servo, but if the torsion bar twists prior to yielding of springs 47, 143, then the control valve element VE is operated to open position prior to movement of the power-piston PP to effect slack take-up and power-assist by the booster servo.

The disclosure also makes clear that the valve element VE may be operated in unison with the axial-rotational movements of pin 81, or optionally, this pin may be operably associated with the valve element in such manner that the pin is effective in one direction only on the valve element in an "opening" direction of movement, but in both cases, the torsion bar 88 is effective to operate the valve element VE to its "on" position of control shown in FIGURE 9 or variations thereof during the "twisting" action of the torsion bar to energize the same to enable transmission of reaction from the work-load (master cylinder) to the operator-operated member (brake-pedal).

Referring to FIGURES 2 and 9, it will be noted that the annular pressure-sealed packing 134 is provided with an annular fluid channel 135 and an annular working edge 138 terminating the working segment 137, the latter comprising the arcuate surfaces on the right leg of the packing and adjacent wall in the valve element proper which define the right side of the cross-slot 146. This annular packing is U-shaped in cross section, and is adapted to utilize the air pressure effective at all times in chamber 16 to effectively seal the peripheral faces of the two spaced legs in intimate working contact with the bore 101 in the valve housing as shown. Since it is essential that the two legs (annular shoulders) of the seal be under pressure at all times to effect its sealing operation, the angular slot 148 is provided in the valve housing to maintain the annular channel 135 interconnected with the passageway 114 even though the valve element has been displaced to the position of FIGURE 9 wherein passageway 115 is isolated from the channel 135, therefore, the packing 134 is pressurized into slight deformation to effect intimate sealing relation with the bore 101 to prevent seepage of air pressure into the atmospheric valve chamber 139. It is therefore, seen that the arcuate portions of the right leg of the packing 134 and adjacent wall defining the left side of the cross-slot 136, define the working segment 137.

FIGURES 12 and 13 demonstrate a modified torsion bar 175 of rectangular cross section which also has its opposite ends slidably disposed in the slots 84a, 85a, the letter "a" being associated with said reference numerals to distinguish identical structure in this modification from that disclosed in the first embodiment (FIGURES 1–11 inclusive). Since this modification is essentially different in cross section only from the torsion bar 88 of the first embodiment, its function is, therefore, identical to that of the first embodiment, therefore reference may be had to the operational description heretofore given in detail in connection with the first embodiment for a clear understanding of the twisting action to bar 175.

FIGURE 14 demonstrates another modified form for torsionally transmitting reaction from the plunger 23 to the pedal, the letter "b" being suffixed to all reference numerals applied to this figure which identify similar parts in the first embodiment. A torsion spring 176 is substituted for the torsion bars 88 and 175 previously described. Oppositely projecting horizontal ends 177, 178 of this torsion spring engage surface slots 179, 180, respectively, in the confronting ends of a modified plunger 181 from which the slot 84 is eliminated and, in actuator A$^b$ the slot 85 is eliminated, said surface slots 179, 180 replacing the slots 84, 85 respectively in these parts. The pin-and-slot connections C$^{1b}$ and C$^{2b}$ impart opposite rotational movements to corresponding opposite ends, respectively, of the torsional spring 176, and thereby transmit reaction from the plunger 181 to the actuator A$^b$ to the connected pedal P as a function of the power-piston acting on the work element 18b. The torsional spring may be pre-energized or installed normally relaxed depending on the degree of reactive force initially desired on the pedal in relation to the full operating range (stroke) of the latter. This torsional reactive means operate in the same manner as already described in connection with the torsion bar 88, and therefore further operational clarification is believed unnecessary.

FIGURE 15 discloses a modified seal assembly which is fixed in the open end 29 of the longitudinal bore 28 in the cylindrical portion of the body 31 of the master cylinder MC, and through which the work element 18 passes. This modified seal assembly comprises; a counterbore substantially coextensive with the rearwardly projecting hub portion of said wall, said counterbore merges with a longitudinal bore 191 to provide an internal annular shoulder 192 spaced from the open end of said counterbore, a thrust-washer 193 having a central circular opening 194 has its peripheral surface portion in abutment with said shoulder, and juxtaposed rearwardly from said thrust-washer is an annular packing 195 of D-shaped cross section, and an annular double-lip packing 196, said packings and thrust-washer being stabilized in operative relationship within said counterbore by the previously described cup-shaped abutment member 40c (see FIGURE 2). The outer lip of the packing 196 normally abuts the end wall 199 which is centrally apertured at 198 for the work unit WU$^c$ to freely pass through to operate the master cylinder piston 27c. Each of said packings has a central opening 199, 200, respectively, corresponding to the opening 194 in the thrust-washer and through which the plunger 23c and connected work element 18c pass as shown, to accommodate reciprocal movement of these fluid-displacing components to pressurize the fluid in the master cylinder MC$^c$ in a well known manner. The forward side of the thrust-washer 193 is abuttable by an annular flange 201 integral with the master cylinder piston 27c, to establish the normal released position of the piston 27c wherein the compensating port 43 is uncovered, said thrust-washer defining the rear (right) end of an annular expansible fluid space 202 having the same function as the annular fluid space 35 (see FIGURE 2) which continuously communicates with the inlet port 44 connected to the fluid supply reservoir 41.

The rear portion 203 of the plunger 23c adjacent the right side of the flange 201, is reduced in diameter to provide an annular external shoulder at 204, said rear portion being provided with an external annular groove 205 fitted with a commercial O-ring seal 206. A similar reduction of the normal diameter of the forward end portion 207 of the work element 18c is made on which is pressfitted the rear end portion of a thin wall tubular sleeve 208 in abutment with an external annular shoulder 209 defining the juncture between the normal diameter of the element 18c and its reduced diameter portion aforesaid. In this manner a smooth uninterrupted cylindrical surface is provided on the work element 18c to work against the sealing surfaces defining the openings 199, 200 in said packings and thereby effecting an airtight seal between the booster servo chamber 17c and the expansible fluid space 202. The forward end portion of the sleeve 208 is normally spaced from the shoulder 204 and is adapted to slidably interfit said reduced portion 203, and thereby accommodate relative displacement of the work element 18c with respect to the plunger 23c and piston 27c to effect the aforesaid "twisting" action on the torsion bar 88c.

Accordingly, this modified seal assembly differs from the seal 33 used in the main embodiment (see FIGURE 2) in that the latter seal assembly is movable as a unit with the plunger and piston 23, 27, respectively, while this modified seal assembly is stationary on the master cylinder MC$^c$, and therefore accommodates relative movement of the piston 27c, and connected plunger 23c with respect to the bore 191 to expand the fluid space 202, and, as in the case of the main embodiment, the work element 18c is relatively displaceable with respect to the plunger 23c during operation of the connection C$^{1c}$. This modified arrangement of the forward seal for the work unit WU$^c$ produces identical cross sectional areas on opposite sides of the power-piston PP, while in the main embodiment, the confronting areas on the left side of the power-piston PP and the right side of the seal 33 are neutralized, that is, ineffective as pressure working areas on the left side of the power-piston which condition is counteracted by a slightly heavier preloaded status of the power-piston return spring 143 to effect return of the power-piston to normal position shown in FIGURE 2 when both servo chambers 16, 17 are under balanced compressed-air conditions. In operation, however, this modification is similar to that of the main embodiment in that it accommodates relative movement of the plunger 23 with respect to the element 18 during operation of the master cylinder MC$^c$.

One of the important advantages provided by this modified seal is that it enables equal pressures to be established in the servomotor chambers 16, 17c when the pressures are balanced to inactivate said servomotor to render the piston return spring 143c effective to return the power-piston PP to its normally released position as shown in FIGURE 2, while in the first embodiment as shown in this latter figure, the constant pressure chamber 16 has less effective cross-sectional area than the variable pressure chamber 17c due to the annular area on the power-piston PP negated by the corresponding opposed area on the movable seal 33. Therefore, to enable spring 143c to return the power-piston to its normal "off" position, this spring must be made stronger to first overcome the aforesaid diminutive pressure differential on opposite sides of the power-piston and then move the power-piston to its released position. Thus, it is seen that a weaker return spring may be employed in the servomotor SM when utilizing the modified seal assembly, to operate the power-piston to released position, than would be required in the first embodiment wherein there is said diminutive pressure differential effective between the servomotor chambers 16, 17c notwithstanding the control valve CV is in "off" position, such pressure differential being due as aforestated to negation of the annular area on the power-piston encircling the work element 18c in the chamber 16 by the confronting area on the seal 33 which moves with the power-piston PP.

In this modification, parts similar to those previously used are identified by the same reference characters, distinguished, however, by the addition of the letter "c" to each.

Since the power-piston PP is connected to move in unison with the work element 18 by the locking ring 57, reaction from the piston return spring 143 carries through to the piston body, work element 18, in cooperation with the "untwisting" action of the torsion bar 88, and reaction from the Belleville spring 141 to establish the operating parts of the present booster servo SM, in their respective normally released positions as shown in FIGURE 2. Springs 141 and 143 continuously oppose operator actuation of the actuator A and since spring 143 is of greater strength than spring 141, the latter spring yields to accommodate displacement of the valve element VE to its operating "on" position shown in FIGURE 9 in response to initial operator force on the pedal P accompanied by "twisting" of the torsion bar 88 to condition the latter to transmit reaction to the pedal from the work load upon the servomotor SM becoming energized. It is important to note that due to negation of a portion of the effective area on the forward side of the power-piston PP by the opposing peripheral portion of the seal 33, the spring 143 must be installed at such preloaded strength as to be capable of supplementing the pressure acting on the remaining effective area on the power-piston in chamber 16 to balance the pressure on the opposite side of the power-piston in chamber 17 for power-inactivation of the servomotor SM under influence of said return spring 143. It is therefore seen that the function of return spring 143 is to first supplement the effective pressure in chamber 16 to balance the pressure in chamber 17, and then overcome the frictional resistance between the power-piston PP and casing 10 to rapidly move the power-piston back to its normally released position as shown in FIGURE 2.

Reference is again made to the use of a booster servo of the super-atmospheric pressure suspended type to attain a more rapid energized status, and therefore a correspondingly shorter pedal travel than normally employed by conventional commercially used boosters. A further advantage results from the use of this type of booster servo in the simplification of the sealing of the cylinder 10, and particularly with respect to the work-performing unit WU, which, upon inspecting FIGURE 2, it will be noted requires only two sealing assemblies, one at each end of the cylinder, said assemblies literally "float" the work unit WU and therefore no radial forces are transmitted through the sealing assemblies for long service life thereof, since the work unit is slidably supported on the master cylinder bore 28 and actuator A the latter in turn being slidably supported on the support rod 150 attached to the cylinder 10 as shown.

While the disclosure illustrates the power-piston PP and control valve CV as separate components joined as a unit by the cap screws 113 (preferably four in number), it is obvious that the control valve housing 102 and the piston plate 50 may be integrated, and that the piston plate 49 and contiguous portion of the packing 51 may also be eliminated in favor of an annular packing carried in an annular groove in the peripheral surface of the plate 50, such variations in the construction of these components being dictated by the particular commercial application of the invention.

Accordingly, applicant has produced a novel and improved compressed-air operated servomotor which provides highly advantageous operating characteristics and space saving installation on the motor vehicle, that the servomotor is economical of manufacture and comprises relatively few operating parts, and thus suitable to mass production, said operating characteristics resulting from the included novel "twisting" action of an element that imparts to the brake-pedal a more "solid" reactive force as a means of controlling the amount of braking force required for safely reducing speed or bringing the vehicle to a halt. Use of the torsion reactive element was resorted to due to the need for a more solid reaction on the pedal as the power-boost increases, to simulate the reaction transmitted by dual-piston hydraulic means of commercially used construction and operation. The various prior art applications of different types of springs, to provide predictable brake control from a booster motor, have the serious disadvantage of producing a "soft" pedal feel tending to cause the operator to over-brake resulting from such sensivity, and too, such reactive springs increasing the work load on the pedal would defeat the primary aim of utilizing a power-booster to provide reduced operator effort. Such increase of the work load is due to the necessity of having to install such springs under heavy preloaded conditions for effectiveness to oppose pedal operation sufficiently to prevent oversensitive control.

Reference is now made to the terminology used in the foregoing description and in the appended claims in which the identifying expression and/or terms employed are intended to convey meanings which include the range of reasonable equivalents in the patent sense. For example, the expressions "servomotor," "booster," "booster servo," "power-piston," "power member," "wall," "assembly," are intended to include any means for operating a work-performing element as a function of relative follow-up control of a power unit from an operator-operated member irrespective of the manner of inducing said pressure differential as by vacuum, hydraulic or compressed air pressure. The terms, "left," "right," "top," "bottom," "vertical," "horizontal," "front," "rear," and other directional words or characters are intended to have only relative connotation for convenience in describing the structure as displayed on the drawings, and are not intended to be interpreted as requiring any particular orientation with respect to associated structure external to the present disclosure or to the operating position thereof.

Although, I have illustrated and described a preferred embodiment and three modifications, and described certain obvious modifications without illustrating the same, it is to be understood that I do not wish such to be limiting as to the exact construction and/or arrangement of the parts shown and/or described, since it is evident that modifications, variations, changes and substitutions may be made therein without departing from the proper scope and fair meaning of the subjoined claims.

Having thus described my invention, I claim:

1. A pressure fluid operated servomotor including a casing in which a movable power assembly is actuatable from normal position by a pressure differential on opposite sides thereof, said power assembly normally dividing the interior of said casing into opposing constant pressure chambers, a source of pressure different from atmosphere, and an operator-operated member having a normally released position, an element movable in part to perform work under influence of power-actuation, movement of said element being opposed by a normally preloaded spring, the improvement which comprises: a control valve provided with a housing in which a cooperating element is movably disposed, said housing and valve element having operative follow-up association with said power assembly to control the same in response to relative displacement of the valve element from normal "off" position wherein said servomotor chambers are interconnected to balance pressures therein for power-deactivation of said servomotor, to operating "on" position wherein said servomotor chambers are isolated to enable establishment of differential pressures therein for power-activation of said servomotor; an annular fluid pressure channel between said valve housing and element; a first fluid passage interconnecting said fluid channel via one of said chambers with said source; a second fluid passage interconnecting said fluid channel with the other of said chambers, an annular atmospheric chamber spaced from said fluid channel and disposed between said valve housing and element; a third fluid passage interconnecting said atmospheric chamber with atmosphere; a variable pressure channel in said valve element, and normally vented to atmosphere via said third fluid passage; a working land on said valve element separating said fluid channel from said variable pressure channel, said working land having the function of selectively controlling said first and second fluid passages to normally place said fluid pressure channel in communication with the servomotor chambers and thereby balance pressures therein for power deactivation, and to place said third fluid passage in communication with said second fluid passage upon isolating said fluid channel from said one pressure chamber to vary the pressure in said other pressure chamber and thereby establish differential pressures in said servomotor chambers for power-activation; reactive torsional means including an element characterized by twisting action to energize the same, and operatively interconnecting said work element with said operator member whereby reaction from said work element induces twisting of said torsional element in a direction opposite to that initially induced by said operator member, to divide the total reaction from said work element between said power assembly and operator member jointly influencing said latter element; and mechanical coupling means effective between said torsional element, work element, and operator member, to energizably twist said torsional element in opposite directions during power-activation of said servomotor.

2. A servomotor constructed in accordance with claim 1 in which the movable element of the control valve is of tubular construction through which the work element passes, said movable element being biased toward normal disposition by spring means including an expansion spring operably disposed in said atmospheric valve chamber to react between the power assembly and said movable element.

3. A servomotor constructed in accordance with claim 1 in which said work element is of tubular construction and includes a pair of elements projecting in part into opposite ends thereof, and annular flanges on said pair of elements respectively normally spaced from said opposite ends to provide relative operating movement of said pair of elements relatively to said tubular work element, one of said pair of elements having an operative connection with said operator-operated member, and the other of said pair of elements being adapted to receive reaction from a work load.

4. A servomotor constructed in accordance with claim 3 in which said mechanical coupling means comprise a pair of diametrically disposed slots in angulated diverging disposition with respect to each in one end of said tubular work element, and another pair of diametrically disposed slots in angulated diverging disposition in an intermediate portion of said tubular work elements; a cross pin projecting through said portions of said pair of elements projecting into opposite ends of said tubular work element, and through said pairs of slots and normally positioned with respect to said slots at opposite ends of each pair of slots, to thereby mechanically interconnect said pair of elements, the tubular work element and said torsional element, to impart opposite twisting action to said last-mentioned element as a function of the element of said pair of elements operatively connected to said operator member initially moved axially and rotationally simultaneously, and subsequent reaction from said other element of said pair of elements under joint influence of said power assembly and operator member, to similarly move the other element relatively to said tubular work element.

5. A servomotor constructed in accordance with claim 4 in which one end of the pin associated with the pair of slots intermediate said tubular work element, engages said movable element of the control valve to impart like movements thereto whereby said movable element is operated from its normal "off" position of control to its operating "on" position of control.

6. A servomotor constructed in accordance with claim 5 in which said element of the reactive torsional means is an elongated cylindrical bar having its opposite ends formed with annular flanges from which extensions respectively project into engagement with recesses in the portions of said pair of elements projecting into said tubular work element whereby said axial-rotational movements of said pair elements induced by operator force and reaction from said work load, impart corresponding opposite rotational movements to opposite ends of said cylindrical bar to twist the same and thereby energize it to transmit reaction from said work load to said operator member.

7. A servomotor constructed in accordance with claim 5 in which said element of the reactive torsional means is an elongated plate of rectangular cross section, and having its opposite ends projecting into engagement with recesses in the portions of said pair of elements projecting into said tubular element whereby said axial-rotational movements of said pair of elements induced by operator force opposed by said work load, impart corresponding opposite rotational movements to opposite ends of said plate to twist the same and thereby energize it to transmit reaction from said work load to said operator member.

8. A servomotor constructed in accordance with claim 5 in which said element of the reactive torsional means is a helically formed spring, and having its opposite ends projecting into engagement with recesses in the portions of said pair of element projecting into said tubular element whereby said axial-rotational movement of said pair of elements induced by operator force opposed by said work load, imparts corresponding opposite rotational movements to opposite ends of said spring to twist the same and thereby energize it to transmit reaction from said work load to said operator member.

9. A servomotor adapted to actuate in part a hydraulic master cylinder or the like comprising: a housing, a movable wall in said housing; a valve housing movable with said wall, a longitudinal cylindrical bore in said valve housing coaxial with the said wall; a tubular normally occupying an "off" position valve element in said valve housing bore; a pair of spaced fluid passages through said valve housing communicating with the bore therein; a third fluid passage spaced from one of said pair of passages in said valve housing, a working segment on said valve element normally disposed to connect said pair of passages; an annular fluid channel on said valve element normally communicating with said pair of passages; a variable pressure channel on said valve elements separated from said annular channel by said working segment, and normally in communication wtih said third fluid passage; an annular atmospheric chamber between said valve element and housing; a fourth fluid passage in said valve housing interconnecting the atmospheric chamber with said third passage; a fifth passage in said valve housing including a flexible conduit leading to the exterior of said valve housing to atmosphere; an internal annular groove in the outer end of said bore in the valve housing; a split stop ring engaging said annular groove to provide an abutment for the confronting end of the valve element to establish the normal "off" position of the latter; a work performing unit movable in part by said wall, said work unit including a tubular element, and a pair of elements projecting in part into opposite ends, respectively, thereof; a mechanical connection operatively incorporated between the tubular element and the associated projecting portions of the pair of elements, respectively, to simultaneously convert relative axial movements of said pair of elements into opposite relative rotational movements thereof; a work load opposing one of said pair of elements; an operator-operated member having a normal position; an operative connection between said operator member and the other of said pair of elements, to operate the same; a torsional element characterized by twisting action and wholly contained within said tubular element between the projecting portions of said pair of elements, and positively coupled to said projecting portions to effect corresponding co-rotational movement therewith, to twist said torsional element and thereby energize the same to transmit reaction from said work load to said operator member as a function of opposing reactions from said work load and operator member on said pair of elements during power-activation of said servomotor; and another operative connection between said valve element and torsional element for operating said valve element.

10. In booster-type fluid pressure activated servomotors having a fluid chamber enclosure and a movable wall dividing said chamber into opposing fluid pressure chambers, a source of pressure different from atmosphere normally communicable with both of said fluid pressure chambers, a control valve to selectively connect one of said fluid pressure chamber to atmosphere to produce differential pressures within said chambers, and to balance pressures within said chamber for power-activation and deactivation, respectively, of said servomotor, and operator-operated member for actuating a portion of said control valve, the improvement which comprises: a work performing unit movable in part by said wall, said work unit including a tubular element, and a pair of thrust elements projecting in part into opposite ends respectively, thereof, said elements being characterized by limited axial and rotational movements relative to said tubular element and to each other; a mechanical connection operatively incorporated between the tubular element and the associated projecting portions of the pair of elements, respectively, to simultaneously convert relative axial movements of said pair of elements into opposite relative rotational movements thereof; a work load simultaneously reacting on said work unit and movable wall and of sufficient magnitude to axially stabilize said unit and wall; an operative connection between said operator member and the other of said pair of elements, to operate the same; and a torsional element characterized by twisting action and wholly contained within said tubular element between the projecting portions of said pair of elements, and which is positively coupled rotationally to said projecting portions to effect corresponding co-rotational movements therewith, to twist said torsional element and thereby energize the same to transmit reaction from said work load to said operator member as a function of opposing reactions from said work load and operator member on said pair of elements during power-activation of said servomotor.

11. In booster-type fluid pressure activated servomotors having a fluid chamber enclosure and a movable wall dividing said chamber into opposing fluid pressure chambers, a source of pressure different from atmosphere, a control valve to selectively establish balanced pressures in said fluid pressure chambers for power-deactivation of said servomotor, and to vary the pressure in one of said fluid pressure chambers to produce differential pressures in said fluid pressure chambers for power-activation of said servomotor, an operator-operated member having a normal position and adapted to operate a portion of said control valve, the improvement which comprises: a work performing unit movable in part by said wall, said work unit including a tubular element, and a pair of thrust elements projecting in part into opposite ends, respectively, thereof, said elements being characterized by limited axial and rotational movements relative to said tubular element and to each other; a mechanical connection operatively incorporated between said tubular element and the associated projecting portions of the pair of elements respectively, to simultaneously convert relative axial movements of said pair of elements into relative rotational movements thereof; a work load reacting simultaneously on said work unit and said movable wall and of sufficient magnitude to axially stabilize said unit and wall; an operative connection between said operator member and the other of said pair of elements, to operate the same; and a torsional element characterized by twisting action and wholly contained within said tubular element between the projecting ends of said pair of elements, and positively coupled rotationally to said projecting portions for corresponding co-rotational movements therewith, to twist said torsional element and thereby energize the same to transmit reaction to said operator member as a function of opposing reactions from said work load and operator member on said pair of elements during power-activation of said servomotor.

12. In a power device having a source of power for energizing a working member, control means for said working member, an element operably associated with said working member for performing work, a personally-operated member operably associated with said working member and control means, operative mechanical connections between said working member, work element, and personal member for simultaneously converting relative axial movements of said work element and personal member with respect to each other and to said working member into opposing rotational movements; and torsional reactive mechanism including an element capable of being twisted under influence of said opposing rotational movements of the work element and personal member, to energize the same to transmit reaction from the work element to the personal member during activation of said working member under joint influence of said source of power and said personal member.

13. In a reaction-transmitting mechanism adapted for use in cooperation with a composite work-performing unit to transmit reaction from the work performed thereby under joint influence of a pair of cooperable actuatable members, with one of said members being effective to control the other member, the improvement which comprises: a thrust-transmitting member having a terminating portion slidably projecting into one end of a tubular portion comprising said work unit; two pairs of operative connections incorporated in longitudinally spaced relation between said tubular portion of said work unit and one of said actuatable members, and said thrust member, respectively; an elongated torsional element capable of being twisted about its axis from normally relaxed status; means enabling the operative connection between said tubular portion and one actuatable member to act on one end of said torsional element; means enabling the operative connection between said tubular portion and thrust member to act on the other end of said torsional element; and an operator-operated member adapted to actuate said one actuatable member relatively to said tubular portion and torsional element to energizably twist the same unidirectionally from its one end, as a function of said last-named operative connection under operator-actuation upon said thrust member encountering sufficient work resistance to convert axial movement thereof into relative rotational movement with respect to said tubular portion and thereby effect counter-twisting of the other end of said torsional element as a function of said operative connection between said tubular portion and thrust member to augment the twisted energized status of said torsional element under joint influence of both of said actuatable members.

14. A reaction-transmitting mechanism constructed in accordance with claim 13 in which each of said operative connections comprises: a pair of diametrically opposed oppositely angulated slots through the wall of said tubular portion of said work unit; a pin projecting through said pair of slots; and an axially slip coupling for connecting opposite ends of said torsional element for co-rotational movement with the said thrust member and said one actuatable member, respectively.

15. A reaction-transmitting mechanism constructed in accordance with claim 14 in which said torsional element comprises an elongated helically formed mechanical spring with opposite ends thereof interconnected with said thrust member and with said one actuatable member, respectively.

16. A reaction-transmitting mechanism constructed in accordance with claim 14 in which said torsional element comprises an elongated metallic bar which terminates at opposite ends in a reduced extension of rectangular cross section; and a transversely disposed cross slot indented in each of the confronting ends of said thrust member and one actuatable member, complementally receive said rectangular ends of said torsional element to lock opposite ends thereof to said thrust member, respectively, and one actuatable member for co-rotation therewith and accommodate relative axial movement therebetween.

17. A reaction-transmitting mechanism constructed in accordance with claim 14 in which said means enabling said operative connection between said thrust member and torsional element to act on the one end of said latter element, comprise: a transverse slot in the end of the aforesaid thrust member; a complemental extension defining the other end of said torsional element, and which slidably projects into said transverse slot to co-rotationally connect the same and to accommodate relative sliding movement therebetween; and an axial slot co-extensive with said extension, said pin which projects through the associated pair of slots, passing through said axial slot without interferring with the relative axial movement of said torsional element with respect to said thrust member.

18. In booster-type fluid activatable servomotors having a fluid chamber enclosure and a movable wall therein dividing said enclosure into a pair of opposing fluid pressure chambers, a source of pressure different from atmosphere, control valve means for said wall and including a movable valve element connected to said source and normally occupying "off" position of control wherein equivalent pressures are effective in said pressure chambers for power-deactivation of said wall, a thrust-output element axially movable in part by said wall to perform work, and operator-actuated means, comprising reaction-transmitting mechanism including a torsion bar operatively interposed in normally relaxed condition in series with said operator means and said thrust element; operative connections between opposite ends of said torsion bar and said operator means and said thrust element, respectively, effective to accommodate limited axial movements of said operator means and said thrust element relative to said torsion bar; mechanical means operatively connecting said operator means to one end of said torsion bar and to said wall, and operatively connecting said thrust element to the other end of said torsion bar and to said wall, for applying opposite twisting forces to said torsion bar to energize the same for reaction transmission from said thrust element when acted on jointly by said wall and operator means, said mechanical means being normally effective to stabilize said torsion bar in normally relaxed condition for unitary axial movement of said operator means, wall and thrust element wherein reaction transmission thereby is negated under initial actuation of said operator means; and means interconnecting said control valve element with said operator means to move as a unit.

19. In booster-type fluid activatable servomotors having a fluid chamber enclosure and a movable wall therein dividing said enclosure into a pair of opposing fluid pressure chambers, a source of pressure different from atmosphere, control valve means for said wall and including a movable valve element connected to said source and normally occupying "off" position of control wherein equivalent pressures are effective in said pressure chambers for power-deactivation of said wall, a thrust-output element axially movable in part by said wall to perform work, and operator-actuated means, comprising reaction-transmitting mechanism including a torsion bar operatively interposed in normally relaxed condition in series with said operator means and said thrust element; operative connections between opposite ends of said torsion bar and said operator means and said thrust element, respectively, effective to accommodate limited axial movements of said operator means and said thrust element relative to said torsion bar; mechanical means operatively connecting said operator means to one end of said torsion bar and to said wall, and operatively connecting said thrust element to the other end of said torsion bar and to said wall, for applying opposite twisting forces to said torsion bar to energize the same for reaction transmission from said thrust element when said wall is operatively energized, said mechanical means being normally effective to stabilize said torsion bar in normally relaxed condition for unitary axial movement of said operator means, wall and thrust element wherein reaction transmission thereby is negated under initial actuation of said operator means; and means interconnecting said control valve element with said operator means for axial movement as a unit relative to said wall and torsion bar upon said thrust element encountering a predetermined work resistance under additional actuation of said operator means thus partially twisting said torsion bar from its one end and simultaneously moving said control valve element to "on" position to produce a pressure differential in said pair of pressure chambers effective to move said wall, and thereby causing said thrust element to operatively twist the other end of said torsion bar for transmitting reaction to said operator means while said wall is under joint influence of said pressure differential and said operator means.

20. In a powder device having a source of power for operatively energizing a working member, control means for said working member, a personally-operated member, and a thrust-output element axially movable in part by said working member to perform work, comprising reaction-transmitting mechanism including a torsion element operatively interposed in normally relaxed condition in series with said personal member and thrust element and wherein resistance of said torsion element to twisting negates reaction transmission thereby under initial operation of said personal member to enable unitary axial movement of said working member, control means and thrust element to subject the latter to a work resistance effective to substantially stabilize the same, said torsion element when subjected to twisting action in opposite directions upon encountering said work resistance under additional operation of said personal member being capable of transmitting reaction from said thrust element; operative connections between opposite ends of said torsion element and said personal member and thrust element, respectively, to provide limited axial movements of said personal member and thrust element relative to said torsion element to enable said twisting action to ensue; mechanical means operatively connecting one end of said torsion element to said personal and working members, and operatively connecting the other end of said torsion element to said thrust element and working member for applying said opposite twisting actions to said torsion element; and means interconnecting said control means with said personal member for unitary movement whereby additional operation of said personal member is effective to move the said control means to control operative energization of said working member and to simultaneously twist the one end of said torsion element in one direction, the other end of said torsion element being twisted counter to said one direction for reaction transmission from said thrust element upon the latter element encountering sufficient work resistance to substantially stabilize the same during operative energization of said working member under joint influence of said power source and said personal member.

21. In reaction-transmitting mechanism adapted for use in cooperation with a thrust-output member axially movable to perform work under joint influence of a pair of actuatable members, with one of said members being capable of controlling the other member, the improvement which comprises: a torsion element capable of being energizably twisted in one direction from normally relaxed status; an operative force-transmitting connection incorporated between said thrust element and said one actuatable member for twisting said torsion element in said one direction; means enabling said operative connection to act on said torsion element in normally relaxed status as a function of the resistance of said torsion element to twisting to move the latter as a unit with said thrust element and other actuatable member under initial actuation of said one actuatable member, to subject said thrust element to a predetermined work resistance sufficient to substantially stabilize the same; an operator-operated member for actuating said one actuatable member relatively to said thrust and torsion elements and thereby energizably twisting said torsion element in said one direction as a function of said operative connection under additional actuation of said one actuatable member by said operator member upon said thrust element encountering said stabilizing resistance under initial actuation of said one actuatable member.

22. In reaction-transmitting mechanism adapted for use in cooperation with a composite element having a thrust portion axially movable to perform work under joint influence of a pair of cooperable actuatable members, with one of said members being capable of controlling the other member, the improvement which comprises: a torsion element capable of being energizably twisted in opposite directions from normally relaxed status for transmitting reaction from said thrust portion; an operative force-transmitting connection incorporated between said composite element and said one actuatable member for twisting said torsion element in one direction; means enabling said operative connection to act on said torsion element to move it in normally relaxed status as a unit with said composite element and said other actuatable member under initial actuation of said one actuatable member, to subject said thrust portion to a predetermined work resistance sufficient to substantially stabilize the same; another operative force-transmitting connection incorporated between said composite element and said thrust portion; means enabling said other operative connection to releasably stabilize said torsion element in normally relaxed status and subsequently imparting twisting action to said torsion element in the opposite direction; an operator-operated member for actuating said one actuatable member relatively to said composite element and torsion element and thereby energizably twisting the latter element in opposite directions as a function of said thrust portion reacting to said stabilizing resistance to induce joint operation of said operative connections under additional actuation of said one actuatable member by said operator member.

23. A reaction-transmitting mechanism constructed in accordance with claim 22 in which said operative connections comprise: two pairs of diametrically-opposed oppositely angulated slots in said composite element in longitudinally spaced relationship with respect to the opposite ends of said torsion element; a pair of axially elongated slots through spaced portions, respectively, of said torsion element; and a pair of pins projecting through said slots in the composite and torsion elements, respectively, to interconnect the latter two elements with said one actuatable member and said thrust portion, respectively.

References Cited by the Examiner

UNITED STATES PATENTS

| | | | |
|---|---|---|---|
| 2,688,258 | 9/54 | Haynes | 92—138 |
| 2,988,059 | 6/61 | Wysong | 91—380 |
| 3,099,167 | 7/63 | Folkerts | 91—372 |

FRED E. ENGELTHALER, *Primary Examiner.*

SAMUEL LEVINE, *Examiner.*